United States Patent [19]

Meyer et al.

[11] Patent Number: 4,745,146

[45] Date of Patent: May 17, 1988

[54] REINFORCED POLYAMIDES HAVING IMPROVED FLOW BEHAVIOR

[75] Inventors: Rolf-Volker Meyer; Rolf Dhein; Dietrich Michael, all of Krefeld; Heinz-Josef Füllmann, Leichlingen, all of Fed. Rep. of Germany

[73] Assignee: Bayer Aktiengesellschaft, Leverkusen, Fed. Rep. of Germany

[21] Appl. No.: 934,486

[22] Filed: Nov. 24, 1986

[30] Foreign Application Priority Data

Dec. 6, 1985 [DE] Fed. Rep. of Germany ....... 3543116
Mar. 29, 1986 [DE] Fed. Rep. of Germany ....... 3610595

[51] Int. Cl.$^4$ .......................... C08K 5/41; C08K 5/13
[52] U.S. Cl. .................................... 524/171; 524/173; 524/326; 524/333; 524/338; 524/339; 524/343
[58] Field of Search ............... 524/171, 173, 333, 338, 524/339, 326, 343

[56] References Cited

U.S. PATENT DOCUMENTS

| | | | |
|---|---|---|---|
| 2,967,774 | 1/1961 | Bell et al. | 524/339 |
| 3,207,620 | 9/1965 | Roth | 524/343 |
| 3,491,157 | 1/1970 | Dietzler et al. | 524/326 |
| 3,530,069 | 9/1970 | O'Neill | 524/333 |
| 3,651,010 | 3/1972 | Cowell et al. | 524/343 |
| 3,763,095 | 10/1973 | Di Battista | 524/333 |
| 4,616,053 | 10/1986 | Schultz et al. | 524/326 |
| 4,628,069 | 12/1986 | Meyer et al. | 524/339 |
| 4,663,371 | 5/1987 | Arnold et al. | 524/343 |

Primary Examiner—Lewis T. Jacobs
Attorney, Agent, or Firm—Connolly & Hutz

[57] ABSTRACT

Thermoplastically processable polyamide moulding compositions which are equipped with inorganic reinforcing materials and contain 3 to 40% by weight, relative to the amount of polyamide, of bisphenols of the formula (I)

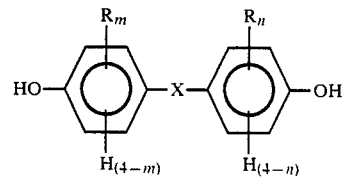

where
R stands for $CH_3$, $CH_3O$, $C_2H_5$ group,
m and n independently of each other denote whole numbers from 0 to 4 and
X denotes a chemical bond, a $C_1$–$C_7$-alkylene or $C_5$–$C_6$-cycloalkylene radical, O, S, SO, $SO_2$, CO or O—$(CH_2)_p$—O— with p=2 to 10 and with the proviso that the sum of the aliphatic C atoms of all the radicals bonded to the phenol rings is <6.

15 Claims, No Drawings

REINFORCED POLYAMIDES HAVING IMPROVED FLOW BEHAVIOR

The invention relates to thermoplastically processable polyamide moulding compositions which contain inorganic reinforcing materials and specific polyphenols.

The known high-grade level of properties of the thermoplastically processable polyamides depends essentially on the hydrogen bonds which are active between various carboxamide groups. It is also substantially affected by the polarity of the hydrophilic nature due to the carboxamide groups, since the hydrophilic nature causes a distinctly measurable absorption of water not only on submersion in water but also in standard atmospheric conditions (see for example Kunststoffhandbuch [Plastics Manual] volume VI, Polyamides, Carl-HanserVerlag, Munich, 1966, pages 458 et seq.).

For instance, the impact resistance of mouldings from polyamides depends considerably on the water content of the mouldings. In the water-free state, for example after preparation of the mouldings by injection moulding, it is in particular the mouldings prepared from freeflowing and hence easily processable polyamides of average molecular weights which are relatively sensitive to impact stress. This is true in particular of mouldings from partially crystalline polyamides.

It is true that the resistance of these mouldings can be considerably improved by conditioning with water. However, at the same time the products are plasticized, which is particularly noticeable from a drastic reduction in stiffness, as measured by the modulus of elasticity.

And for many fields of use, for example for tool housings, hub caps, car door handles or even window sections or bicycle frames, the stiffness and hardness of polyamides themselves is too low, nor sufficiently constant as a result of the high dependence on the water content.

To improve this aspect, polyamides have for a long been equipped with inorganic reinforcing materials, preferably with glass fibres or mineral fillers.

However, the increase in stiffness, hardness, heat distortion resistance and dimensional stability obtained by means of the inorganic reinforcing materials is generally obtained at the cost of disadvantages, in particular at the cost of reduced flowability—in particular in the case of fibrous reinforcing materials—as a result of which the processability is impaired.

Not only these disadvantages increase with the amount of inorganic reinforcing materials, but also as the proportion of inorganic reinforcing materials increases it becomes more difficult to produce mouldings having flawless surfaces.

There is thus a need for polyamide moulding compositions which are equipped with inorganic reinforcing materials and which have improved flow behaviour and hence easier processability and a higher stiffness.

It has now been found, surprisingly, that the above-mentioned disadvantages can be overcome and the flowability of polyamide moulding compositions equipped with inorganic reinforcing materials be drastically improved by modifying the moulding compositions with specific polyphenols. This is true in particular of polyamide moulding compositions which are equipped with glass fibres and/or mineral reinforcing fillers.

The invention therefore provides thermoplastically processable polyamide moulding compositions which are equipped with inorganic reinforcing materials and which are characterized in that they contain 3 to 40% by weight, preferably 5 to 35% by weight, particularly preferably 6 to 25% by weight, relative to the amount of polyamide, of bisphenols of the general formula (I)

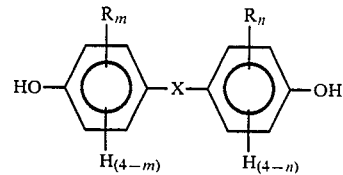

where
- m and n independently of each other denote whole numbers from 0 to 4, preferably 0, 1, 2 particularly preferably 0;
- R stand for a methyl, methoxy or ethyl group, preferably a methyl group
- X is a chemical bond or a bivalent aliphatic $C_1$-$C_7$-, preferably $C_1$-$C_3$-, cycloaliphatic $C_5$-$C_6$-hydrocarbon radical or a bridge member O, S, SO, $SO_2$, CO or -O(CH$_2$)$_p$O- with p=2–10, preferably 2 or 4, with the proviso that the sum of the aliphatic C atoms of all radicals R bonded to a phenol ring is <6, preferably <3.

X is preferably a chemical bond, a $C_1$-$C_3$-alkylene radical, O, $SO_2$, particularly preferably —$CH_2$—, —$C(CH_3)_2$—or —$SO_2$—.

Examples of the bisphenol groups to be used according to the invention are:
dihydroxydiphenyls
bis-(hydroxyphenyl)-alkanes
bis-(hydroxyphenyl)-cycloalkanes
bis-(hydroxyphenyl) sulphides
bis-(hydroxyphenyl) ether
bis-(hydroxyphenyl) ketones
bis-(hydroxyphenyl) sulphoxides
bis-(hydroxyphenyl) sulphones and
α,α-bis-(hydroxyphenyl)-diisopropylbenzenes.

The said groups of bisphenols contain the following representatives to be used according to the invention:
4,4'-dihydroxydiphenyl, where appropriate in mixture with
2,4'-dihydroxydiphenyl
4,4'-dihydroxy-3,3',5,5'-tetramethyldiphenyl
4,4'-dihydroxy-3,3'-dimethylphenyl
bis-(4-hydroxyphenyl)-methane
bis-(4-hydroxy-3,5-dimethylphenyl)-methane
bis-(4-hydroxyphenyl)-ethane
2,2-bis-(4-hydroxyphenylpropane ("bisphenol A")
2,2-bis-(4-hydroxyphenyl-3,5-dimethylphenyl)-propane
2,2-bis-(4-hydroxy-3,3'-dimethylphenyl)-propane
1,1-bis-(4-hydroxyphenyl)-cyclohexane
1,1-bis-(4-hydroxy-3,5-dimethylphenyl)-cyclohexane
bis-(4-hydroxyphenyl) sulphone
bis-(4-hydroxy-3,3'-dimethylphenyl) sulphone
bis-(4-hydroxy-3,3-dimethylphenyl) sulphone
bis-(4-hydroxyphenyl) sulphide
bis-(4-hydroxy-3,5-dimethylphenyl) sulphide
bis-(4-hydroxy-3,5-dimethylphenyl) sulphide
bis-(4-hydroxyphenyl) oxide
bis-(4-hydroxy-3,5-dimethylphenyl) oxide
bis-(4-hydroxyphenyl) ketone bis-(4-hydroxy-3,5-dimethylphenyl) ketone
bis-(4-hydroxy-3,3'-diethylphenyl)-propane,

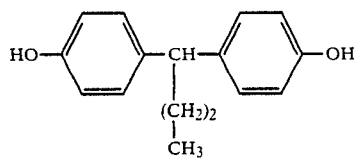

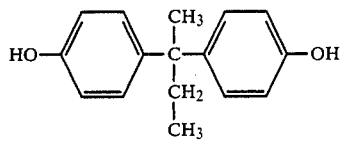

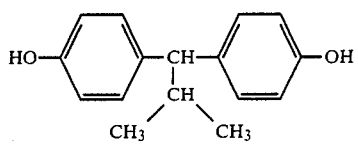

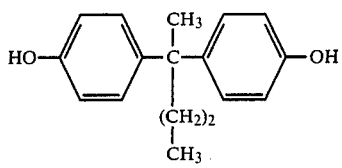

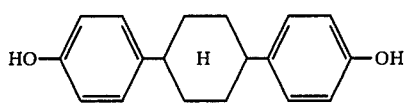

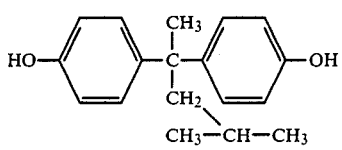

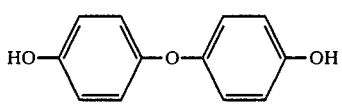

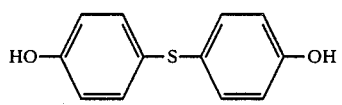

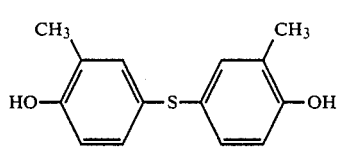

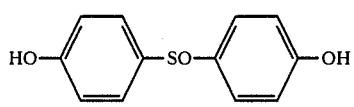

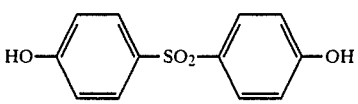

-continued

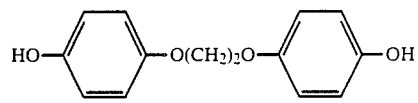

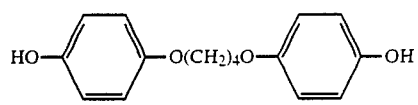

Particularly suitable bisphenols are:
bis-(4-hydroxyphenyl)-methane
bis-(4-hydroxy-3,5-dimethylphenyl)-methane
2,2-bis-(4-hydroxyphenyl)-propane
2,2-bis-(4-hydroxy-3,5-dimethylphenyl)-propane
2,2-bis-4-hydroxy-3,3'-dimethylphenyl)-propane
1,1-bis-(4-hydroxyphenyl)-cyclohexane
bis-(4-hydroxyphenyl) sulphone
bis-(4-hydroxy-3,5-dimethylphenyl) sulphone
bis-(4-hydroxyphenyl) sulphide.

The bisphenols mentioned can be used alone or in mixtures.

Very particularly preferred are
bis-(4-hydroxyphenyl)-methane and
bis-(4-hydroxyphenyl)-propane ("bisphenol A").

The lastmentioned products can also be used in their crude state, i.e. contaminated with the corresponding 2,4-isomers and with small amounts of bisphenols of indan structure, chromane structure and even the homologous trinuclear trisphenols.

It is true that the use of phenols for improving specific properties of polyamides has been known for a long time.

For instance, sterically hindered phenols, i.e. phenols which are substituted in at least one, preferably in all, o-positions relative to the phenolic OH group by $\geq C_3$ groups (for example by t-butyl, cyclohexyl), are used as heat stabilizers in polyamides.

However, owing to their sterical hindrances and owing to the high proportion of aliphatic C atoms in the phenol molecules, these products exhibit compatibility problems in higher concentrations (exudation!), and moreover are very costly.

DOS (German Published Specification) 1,769,662 used specific phenols which lead to an improved deformation resistance of fibres, bristles and yarns, the phenols of fewer than 4 benzene rings likewise having mandatorily to carry secondary or tertiary alkyl groups, i.e. sterically exacting groups, in either or both o-positions relative to the phenolic OH groups.

These polyphenols are likewise of little utility for the purposes of the invention.

DOS (German Published Specification) 1,912,111 describes plasticized polyamides which contain, as plasticizer components, mixtures of esters of long-chain carboxylic acids and phenolic compounds.

This specification, like the other specifications mentioned above, contains no reference to reinforced polyamides. Instead of the known plasticizer effect, the polyamides modified according to the invention even exhibit in many cases an increase in the stiffness.

DOS (German Published Specification) 3,248,329 recommends the use of monophenols for reducing the water absorption of partially crystalline polyamides.

The monophenols mentioned there tend in higher concentrations to exudate and to form a coating, presumably also owing to the low content of phenolic groups in the monophenols, and also lead to measurable loss of stiffness.

The bisphenols used according to the invention are used in reinforced moulding compositions based on polyamides, preferably in an amount of 5–35% by weight, particularly preferably in an amount of 6 to 25% by weight, relative to the amount of polyamide.

The polyamides used can be linear polycondensates of diamines and dicarboxylic acids such as 6,6-, 6,7-, 6,8-, 6,9-, 6,10-, 6,12-, 8,8-, 12,12-polyamide from amino acids and the corresponding lactams of at least 5C atoms, such as, for example, $\epsilon$-caprolactam, laurolactam or polycondensates of aromatic dicarboxylic acid such as isophthalic acid, tererphthalic acid with diamines such as hexamethylenediamines, octamethylenediamine, from araliphatic starting materials such as m- or p-xylylenediamines and adipic acid, suberic acid, sebacic acid, polycondensates based on alicyclic starting materials such as cyclohexanedicarboxylic acid, cyclohexanediacetic acid, diaminodicyclohexylmethanes, isophoronediamine.

It is preferred to use partially crystalline polyamides, particularly preferably PA-6 and PA-6.6, in particular with relative viscosities (measured in 1% solution in m-cresol at 25° C.) of 1.6 to 2.5 in the case of amorphous polyamides and of 2.5 to 5.0 or 2.7 to 4.5 in the case of partially crystalline polyamides.

The inorganic reinforcing component is present in the moulding composition in 5 to 60% by weight, preferably 10 to 40% by weight, particularly preferably 15 to 35% by weight, relative to the amount of polyamide.

Suitable inorganic reinforcing materials are a large number of known substances of different chemical compositions and different particle shapes or particle geometries.

For instance, the particles can predominantly have the shape of spheres, cubes, rectangular blocks, platelets and in particular the shape of fibres. A survey in this respect is found in Kunststoffe 73, 511 et seq. (1983).

Chemically, the inorganic reinforcing materials are predominantly carbonates, preferably $CaCO_3$ (chalk, dolomite, calcite, amolite), silicates (asbestos, kaolin, talc, mica, quartz, wollastonite) or metal oxides (aluminium oxide/aluminium hydroxide, alumina), or even, where appropriate, metal powders (for example aluminium, steel, copper).

The particle size of the reinforcing materials is variable within wide ranges; the inorganic reinforcing materials can be aftertreated, for example in order to have better adhesion to the polyamide matrix.

The named representatives of the inorganic reinforcing materials can be present in the reinforced polyamides alone or in combination of multiples.

It is particularly preferred to use glass fibres, glass balls (solid and hollow balls), chalk, kaolin, talc and/or wollastonite.

A particularly highly improved flowability and hence easier processing is obtained with the bisphenol in partially crystalline polyamides which contain fibrous reinforcing materials.

To prepare the moulding compositions according to the invention, the polyamide component, the inorganic reinforcing component and the bisphenol component can be mixed with one another in any order above the melting point of the polyamide. This can be effected for example immediately after the preparation of the polyamide by admixing the bisphenol modifier to the melt to be spun as a strand, and by then effecting the compounding with the stiffening inorganic components subsequently. Preferably, however, the polyamides modified according to the invention are prepared by mixing all starting components, i.e. that of the polyamide, that of the stiffness-increasing inorganic reinforcing materials and the bisphenol component in a single operation in conventional screw machines.

A similar procedure can be used for the additional incorporation of other additives, such as, for example, dyestuffs or mould release auxiliaries.

In this, the bisphenol component can even be metered together with the polyamide component into the intake port of the extruder, or, however, be added to the compositions to be extruded at a later time during the extrusion.

The compounding can be done with conventional known apparatuses. Twin screw extruders are preferably used.

The highly flowable reinforced polyamide moulding compositions according to the invention are distinguished, given their otherwise essentially constant spectrum of properties, from similar moulding compositions which contain no bisphenols by highly improved flowability and better processability and flawless surfaces (fewer flow line marks in the case of large mouldings out of moulds having multiple feed points). In individual cases it is even additionally possible to obtain an improvement in stability to the effect of moisture and inorganic salts, heat and UV light ("weather stability"), although the phenols to be used according to the invention are not sterically hindered.

The new polyamide moulding compositions are suitable in particular for preparing mouldings by the injection moulding process, in particular for large-area and complex mouldings, which are otherwise preparable only with surface flaws and high technical complexity in the processing or frequently not at all.

The products are preferably suitable for uses in automotive construction (body parts, hub caps, door handles, fan blades) and also for example for drilling machine housings or bicycle frames.

The flow length quoted in the examples is determined as follows:

The flow length is a measure of the flowability of a product and hence of its processability; higher flow length signifies better flowability and hence shorter injection cycles.

The flow length was determined as follows: The sample under investigation is injected with an injection pressure of 72 bar by means of an injection moulding machine whose cylinder temperature is 260° C. into a specific mould which is maintained at 90°. Particularly freeflowing materials are capable of filling the mould under these conditions, so that a 100 cm long spiral can be removed afterwards. Less flowable materials fill the mould only partially under the conditions described; then, as a consequence of the premature solidification of the melt, only spirals of <100 cm in length can be obtained.

The flow length quoted is the length in cm which was reproduced 5 times.

EXAMPLE 1

6.3 kg of PA-6 having an $\eta$rel of 2.9 and 700 g of bisphenol A (10% by weight relative to polyamide) are separately metered into the front intake port of a twin screw extruder of the ZSK 53 type (length about 1.5 m) and extruded at 270° C. with a throughput of 30 kg/h.

3.0 kg of glass fibres (Silenca® 8041) are continuously metered into the product melt via a second intake port which is 50 cm upstream of the extruder outlet, and are extruded together with the polyamide and the bisphenol component, spun as a strand into a waterbath and chopped into granulates.

The product which is present as a granulate is dried to a water content of <0.1%. The power consumption of the extruder running at a constant speed of rotation was 20A (at 270° C.). The product properties measured on test specimens are listed in Table 1, as are those of comparative products without added bisphenol.

EXAMPLES 2-4

Example 1 is repeated, except that in each case the components mentioned in Table 1 are used for preparing the product.

Except for the glass fibres, all the components are metered into the front intake port of the extruder.

In the case of PA 6.6 the extrusion temperature was 290° C. The properties determined on the products obtained in each case are listed in Table 1.

A granulate dried to a water content of <0.1% is used to injection mouldt specimens which have the properties mentioned in Table 2.

Comparative experiment 3 corresponds to Example 5 without addition of bisphenol.

EXAMPLES 6-8

As described in Example 5, products with varying contents of mineral reinforcing materials and bisphenols are prepared.

The properties of the products are listed in Table 2.

Comparative experiment 4 as Example 6 without bisphenol.

EXAMPLE 9

Example 5 is repeated, except that 60 parts by weight of nylon-6 ($\eta$rel 2.9), 40 parts by weight of kaolin and 6 parts by weight of bisphenol are metered independently and simultaneously into the extruder and are then further treated as described.

Comparative experiment 5

Example 1 is repeated, except that instead of a bisphenol according to the invention 7 parts by weight of

TABLE 1

Product compositions (in parts by weight) and properties

| Experiment | PA type | ($\eta$rel) | amount | Bisphenol type | Bisphenol amount | Glass fibre | Power consumption extruder (A) | Flow length (cm) | Modulus of elasticity [N/mm$^2$] a | b | Surface quality c |
|---|---|---|---|---|---|---|---|---|---|---|---|
| Example 1 | PA-6 | (2.9) | 63 | I | 7 | 30 | 20 (270° C.) | 74 | 8410 | 5670 | very good |
| Comparative experiment 1 | PA-6 | (2.9) | 70 | I | 0 | 30 | 26 (270° C.) | 62 | 7640 | 5140 | good |
| Example 2 | PA-6 | (2.9) | 62.5 | I | 15 | 30 | 15 (270° C.) | 82 | 9350 | 6970 | very good |
| Example 3 | PA-6 | (2.9) | 54.5 | II | 15 | 30 | 14 (270° C.) | 90 | 9390 | 6880 | very good |
| Example 4 | PA-66 | (3.0) | 63 | I | 7 | 30 | 15 (290° C.) | 65 | 9550 | 7620 | very good |
| Comparative experiment 2 | PA-66 | (3.0) | 70 | I | 0 | 30 | 26 (290° C.) | 42 | 8430 | n.d. | very good |

I = bisphenol A
II = 4,4-dihydroxydiphenyl
a immediately after injection moulding
b after conditioning (70 h in water at 23° C., then 14 days in standard atmosphere)
c test on 10 cm round plate

EXAMPLE 5

A nylon-6 mineral-reinforced with 40% by weight of kaolin ($\eta$rel of the PA: 2.9) is as described in Example 1 metered together with 6% of bisphenol A into the intake port of extruder, extruded together at 260° C., spun as a strand and granulated.

4-dodecylphenol are used.

For a comparable flow length, the modulus of elasticity (immediately after injection moulding) is, instead of 8410N/mm$^2$ only 6120N/mm$^2$, i.e. undesirable plasticization takes place.

TABLE 2

Composition and properties of mineral-polyamides

| Example | PA-type, ($\eta$rel) | Amount parts by weight | Bisphenol A parts by weight | Kaolin parts by weight | Power consumption in the extruder (A) | Flow length cm | Modulus of elasticity [N/mm$^2$] a | b | Surface quality c |
|---|---|---|---|---|---|---|---|---|---|
| Example 5 | PA-6(2.9) | 60 | 6 | 40 | 42 (260° C.) | 42 | 5750 | 3490 | + |
| Example 6 | PA-6(2.9) | 60 | 12 | 40 | 20 (260° C.) | 51 | 5960 | 3850 | ++ |
| Comp. experiment 3 | PA-6(2.9) | 60 | — | 40 | 60 (260° C.) | 32 | 5450 | 2960 | — |
| Comp. experiment 4 | PA-6(2.9) | 70 | — | 30 | 42 (260° C.) | 43 | 4540 | 2680 | — |
| Example 7 | PA-6(2.9) | 70 | 7 | 30 | 21 (260° C.) | 58 | 5140 | 2850 | ++ |
| Example 8 | PA-6(2.9) | 70 | 14 | 30 | 14 (260° C.) | 63 | 5420 | 2940 | ++ |
| Example 9 | PA-6(2.9) | 60 | 6 | 40 | 44 (260° C.) | 40 | 5690 | 3450 | ++ | a and b see Table 1 for explanations
c test on 10 cm round plates
— moderate, white spots
+ good, no white spots
++ very good, glossy surfaces

We claim:

1. A thermoplastically processable polyamide moulding composition equipped with inorganic reinforcing material, in which moulding composition contains 3 to 40% by weight, relative to the amount of polyamide, of bisphenol(s) of the general formula

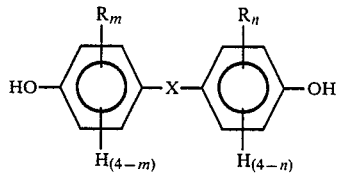

in which
R stands for a methyl, methoxy or ethyl group,
m and n are independently 0, 1, 2, 3 or 4, and
X denotes a chemical bond, a $C_1$-$C_7$-alkylene or $C_5$-$C_6$-cycloalkylene radical, O, S, SO, $SO_2$, CO or O-$(CH_2)_p$-O- with p=2 to 10
and with the proviso tnat the sum of the aliphatic carbon atoms of all the radicals bonded to the phenol rings is <6.

2. A moulding composition according to claim 1, containing 5 to 30% by weight of bisphenol(s) of formula (I).

3. A moulding composition according to claim 2, containing 6 to 25% by weight of bisphenol(s) of formula (I).

4. A moulding composition according to claim 1, in which m and n are independently 0, 1 or 2.

5. A moulding composition according to claim 1 in which X denotes a chemical bond, a $C_1$-$C_3$-alkylene radical, O or $SO_2$.

6. A moulding composition according to claim 1 in which the polyamide(s) used are partially crystalline polyamide(s).

7. A moulding composition according to claim 1 in which the inorganic reinforcing materials are spherical, platelet-shaped and/or fibre-shaped.

8. A moulding composition according to claim 1 containing 5 to 60% by weight, relative to the amount polyamide of an inorganic reinforcing material selected from carbonates, silicates, metal oxides and metals.

9. A moulding composition according to claim 7, in which the inorganic reinforcing material is selected from glass fibres, glass balls, chalk, kaolin, wollastonite, talc and mixtures thereof.

10. A moulding whenever produced from a moulding composition according to claim 1.

11. A thermoplastically processable polyamide moulding composition equipped with inorganic reinforcing material, in which moulding composition contains 3 to 40% by weight, relative to the amount of polyamide, of bisphenol(s) of the general formula

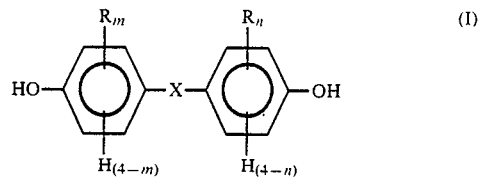

in which
R stands for a methyl,
m and n are independently 0, 1, 2, 3 or 4, and
X denotes a chemical bond, a $C_1$-$C_7$-alkylene or $C_5$-$C_6$-cycloalkylene radical, O, S, SO, $SO_2$, CO or O-$(CH_2)_p$-O- with p=2 to 10
and with the proviso that the sum of the aliphatic carbon atoms of all the R radiacals bonded to the phenol rings is <6.

12. A thermoplastically processable polyamide mouldings composition equipped with inorganic reinforcing material, in which moulding composition contains 3 to 40% by weight, relative to the amount of polyamide, of bisphenol(s) of the general formula

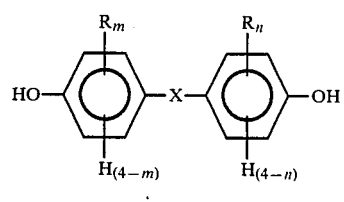

in which
R stands for a methyl, methoxy or ethyl group,
m and n are independently 0, 1, 2, 3 or 4, and
X denotes a chemical bond, a $C_1$-$C_7$-alkylene or $C_5$-$C_6$-cycloalkylene radical, O, S, SO, $SO_2$, CO or O-$(CH_2)_p$-O- with p=2 to 10
and with the proviso that the sum of the aliphatic carbon atoms of all the R radicals bonded to the phenol rings in <3.

13. A moulding composition according to claim 11, in which m and n are 0.

14. A moulding composition according to claim 11, in which the bisphenol(s) is, selected from bis-(4-hydroxyphenyl)-methane, bis-(4-hydroxy-3,5-dimethylphenyl)-methane, 2,2-bis-(4-hydroxyphenyl)-propane, 2,2-bis-(4-hydroxy-3,5-dimethylphenyl)-propane, 2,2-bis-(4-hydroxy-3,3'-dimethylphenyl)-propane, 1,1-bis-(4-hydroxyphenyl)-cyclohexane, bis-(4-hydroxyphenyl) sulphide. bis-(4-hydroxy-3,5-dimethylphenyl) sulphone, bis-(4-hydroxyphenyl) sulphone and mixtures thereof.

15. A moulding composition according to claim 11, in which the bisphenol used is bisphenol A.

* * * * *